Jan. 31, 1956   F. G. STEELE   2,733,430
ANGULAR QUANTIZER
Filed June 3, 1952   3 Sheets-Sheet 1
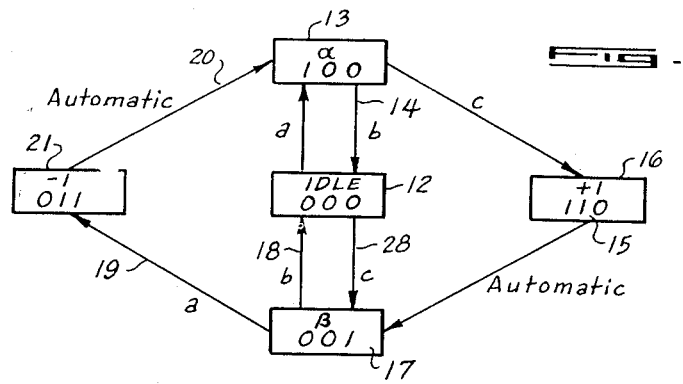
FIG. 1
| | Contents | | Generate | | |
|---|---|---|---|---|---|
| | a b c | I J K | I J K | +1 | -1 |
| 25 | 0 0 0 | 0 0 0 | | | |
| 26 | 1 0 0 | 0 0 0 | 1 | | |
| 27 | 0 0 1 | 0 0 0 | 1 | | |
| 28 | 0 1 0 | 1 0 0 | 0 | | |
| 29 | 0 0 1 | 1 0 0 | 1 | | |
| 30 | 0 0 X | 1 1 0 | 0 0 1 | 1 | |
| 31 | 0 1 0 | 0 0 1 | 0 | | |
| 32 | 1 0 0 | 0 0 1 | 1 | | |
| 33 | X 0 0 | 0 1 1 | 1 0 0 | | 1 |
FIG. 2
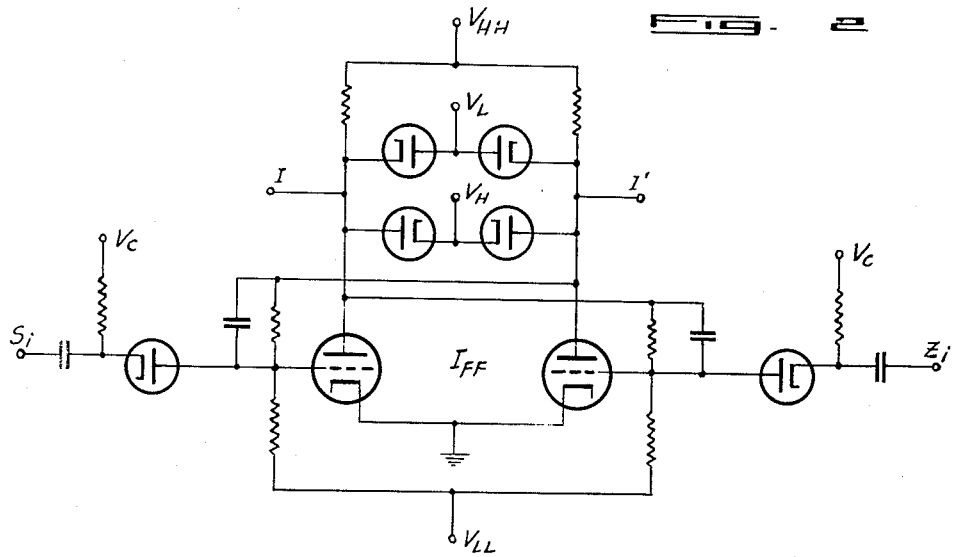
FIG. 3
INVENTOR:
*Floyd G. Steele*
BY
*W. E. Beatty*
ATTORNEY Jan. 31, 1956     F. G. STEELE     2,733,430
ANGULAR QUANTIZER
Filed June 3, 1952     3 Sheets-Sheet 3
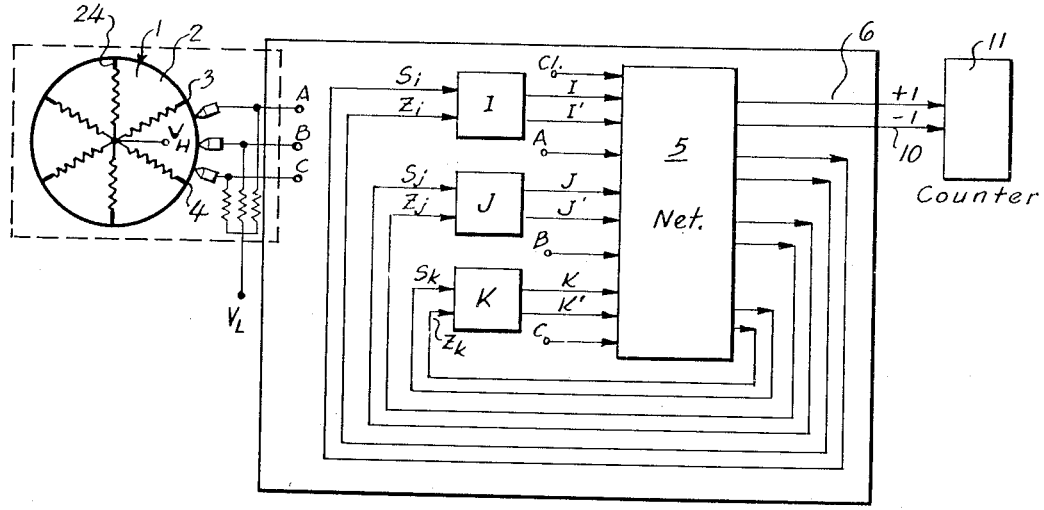
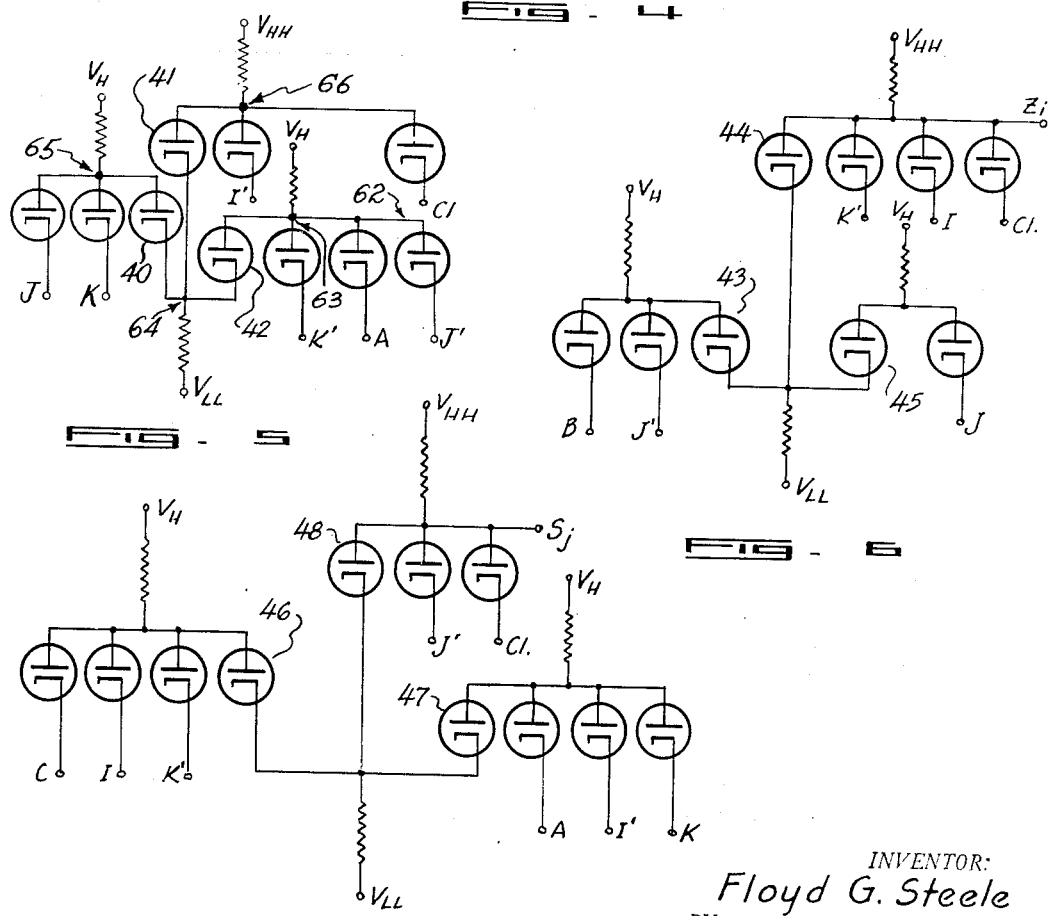
INVENTOR:
Floyd G. Steele
BY
W. E. Beatty
ATTORNEY

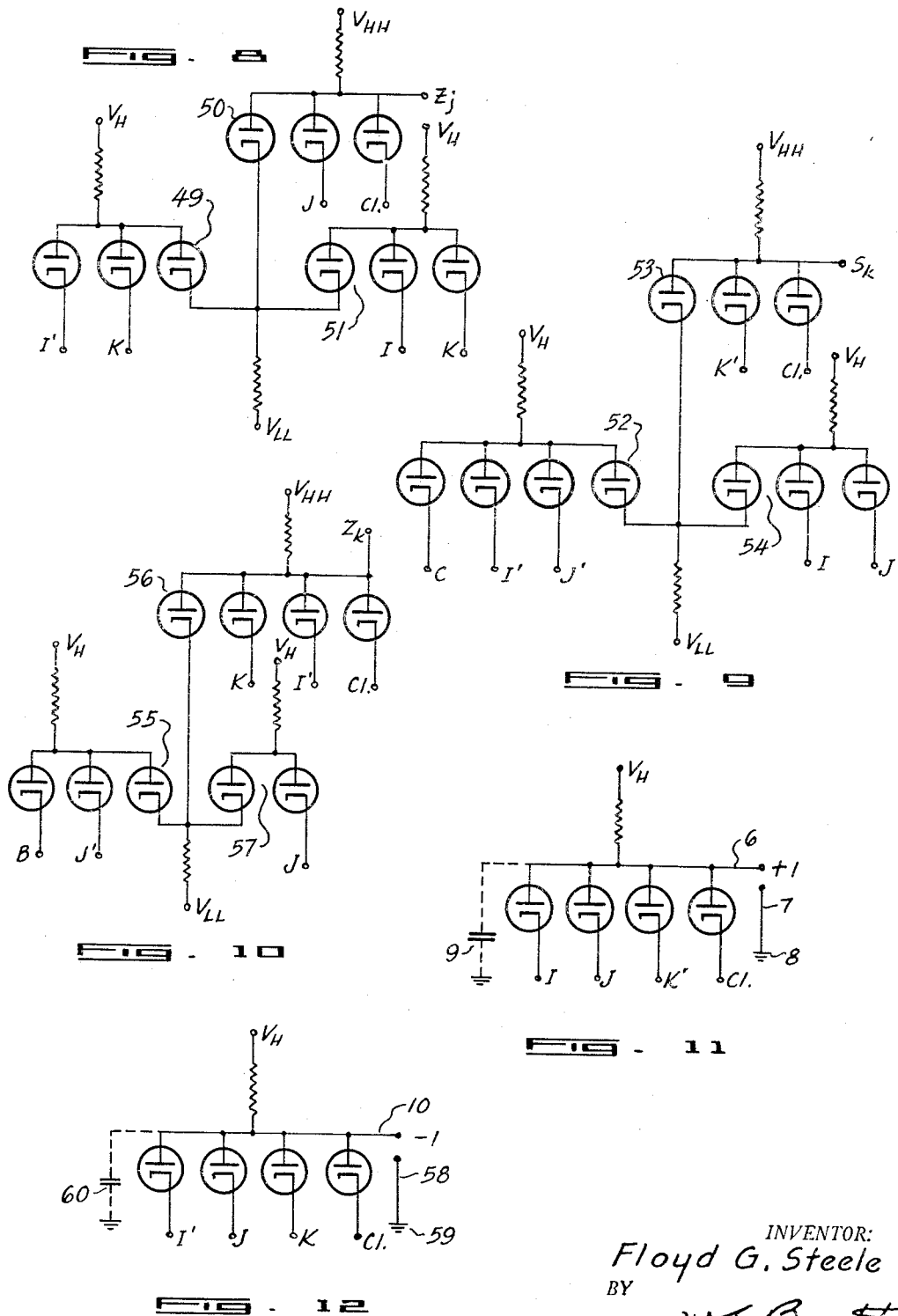

United States Patent Office 2,733,430
Patented Jan. 31, 1956

2,733,430

ANGULAR QUANTIZER

Floyd G. Steele, La Jolla, Calif., assignor to Digital Control Systems, Inc., a corporation of California Application June 3, 1952, Serial No. 291,477

8 Claims. (Cl. 340—347)

The invention relates to a bi-directional angular quantizer and more particularly to a bi-directional angular quantizer which effectively eliminates various types of sensing errors.

One of the chief sources of error encountered in quantizing angular movement, for example, in conventional quantizing devices occurs upon shaft jitter or vibration during the first instant of contact between a brush and energized segment, a light beam and aperture, a high frequency field and inductive pick-up, etc., as determined by the particular energy sensing device utilized. Upon such an occurrence, a series of such energy contacts would be made, and the computing instrument, for example, using the output signals produced by the quantizer would receive a series or train of pulses electrically representing, in turn, amounts of rotation which never occurred. This is true since in conventional quantizers each predetermined amount of angular movement is represented by a single output signal produced directly by an energy contact.

Extra input signals, not actually corresponding to shaft rotation, may in practice be produced by actions other than shaft jitter noted above. For example, in brush-energized segment sensing circuits, electrical arcing may occur during the first moment of engagement and ensuing high frequency transients produced. Each pulse in this transient waveform, in turn, would appear as a separate input signal to the associated computing instrument with resulting computational errors being thereby produced. As a final cause of error, during the travel of the energized segment across a given brush, vibration may cause the brush to bounce away from and then into contact with the segment hence again producing additional unwanted signals.

The present invention contemplates a bi-directional angular quantizer which effectively eliminates errors of the type noted above and, at the same time requires only a minimum of electronic circuitry and components. Briefly, this is accomplished by having spaced energized segments on the periphery of the disc, given as an example of a sensing device only, sequentially contact three spaced brushes, any particular sequence depending, of course, on the rotational behavior of the shaft at that time. Associated with these brushes are three flip-flops, gating circuitry for triggering the flip-flops, and a timing signal source. Now, whenever one particular brush is contacted by an energized segment, then the conduction state sequence of the three flip-flops is established in a predetermined manner. Upon rotation of the disc such that one of the remaining brushes is contacted, then upon the first instant of such contact, one of the remaining flip-flops is triggered by the gating circuitry and once its conduction state has been reversed, then further signals applied thereto from that brush as produced by transients, brush bounce, shaft jitter, etc. are ineffective to produce and any further flip-flop triggerings. The resulting new sequence of the flip-flop conduction states is then established in accordance with the then existing angular relationship between the segment and the three brushes.

Upon further movement of the segment such that it proceeds around to contact the remaining brush, another flip-flop is triggered and the ensuing conduction state sequence of the flip-flops serves to isolate any additional signals transmitted at that time by this remaining brush. This conduction state sequence is then automatically cycled without further action on the part of the shaft by the gating circuitry into yet another sequence and, simultaneously therewith, a +1 output signal is produced on an output +1 line to thereby indicate the completion of a given amount of angular rotation in a designated positive direction. A continuation of the shaft rotation in the same direction next causes the first mentioned particular brush to be contacted and, upon such an occurrence, the original or predetermined conduction state sequence is again generated.

On the other hand, had the brush contact sequence been opposite to that explained above, as caused by a negative direction of shaft rotation, then upon the first brush-segment contact a different flip-flop from the one previously mentioned would be triggered and its conduction state in conjunction with the conduction states of the two remaining flip-flops would indicate the shaft's new angular position. Then, upon continuation of this opposite direction of rotation, the next brush contacted would, in turn, cause a new conduction state flip-flop sequence to be generated which sequence would automatically be changed by the gating circuitry into still another sequence and upon this occurrence, a −1 output signal would be generated, it appearing on a −1 output line. The final conduction state sequence would, upon recontact of the previously mentioned particular brush, be changed into the initial or predetermined sequence and the quantizer prepared for further shaft rotations.

In this way, an output signal is generated on the proper output line after each predetermined amount of angular rotation in either direction and then only upon the automatic change from one specified conduction state sequence into another. Accordingly, all output signals are entirely isolated from the actual brush-segment contacts. Also, by having only a single flip-flop triggered by any given brush-segment contact and have the resulting new conduction state sequence thereby isolate, through the gating circuitry, further identical brush-segment contacts from effecting the operation of the remaining flip-flops, it has been possible to achieve a quantizer incapable of producing spurious output signals of the type normally produced by conventional quantizing devices.

Accordingly, it is the principal object of the present invention to provide an angular quantizer for quantizing bi-directional movement without introducing output signal errors of the type normally produced by brush bounce, jitter and transients.

Another object of the present invention is to provide a bi-directional angular quantizer for quantizing shaft rotations wherein additional input signals thereto produced by brush bounce, shaft jitter, or transients are isolated from the output signal.

Other objects and features of this invention will be readily apparent to those skilled in the art from the following specification and appended drawings illustrating certain preferred embodiments of this invention in which:

Fig. 1 is a flow diagram illustrating the conduction state sequences of the quantizer's flip-flops in operation;

Fig. 2 is a table showing the conduction state sequence changes generated in the flow diagram of Fig. 1;

Fig. 3 is a circuit diagram of a representative flip-flop utilized in the quantizer of the present invention;

Fig. 4 is a block schematic representation of the quantizer according to the present invention; and Figs. 5 through 12 are circuit diagrams of the individual gating circuits set forth schematically in Fig. 4.

Referring in detail to the drawings, in Fig. 4 a commutator 1, here schematically illustrated, is rotatable in opposite directions and comprises, around its periphery, a plurality of insulating segments 2, each having a greater arcuate length than the over all width of the brushes A, B, and C. The commutator 1 has conducting segments like 3 and 4 each of which is narrower than the distance between adjoining pairs of brushes A, B, and C. The conducting segments are each connected as indicated by the respective zig-zag lines to a source of voltage indicated at $V_H$ which may be of the order of 140 volts. Typical values of the various voltages used will be given later.

Brushes A, B, and C are connected to a network 5 in Fig. 4 by lines of the corresponding letters, these three lines being connected through three respectively associated resistors to a source of relatively low voltage $V_L$, which may be of the order of +100 volts. The details of network 5 are shown in Figures 5 to 12 inclusive. Also applied to network 5 is a timing control signal comprising a series of alternate high and low voltage levels and produced from a source commonly referred to as a clock and indicated in the drawings as "$Cl$."

Interconnected with network 5 are three bi-stable flip-flops I, J and K. Each of these flip-flops is the same in circuitry; with details of the I flip-flop being shown in Fig. 3.

Referring to Fig. 4, the input leads to each of flip-flops I, J, and K are indicated by S, and Z, followed by the same subscript as the letter indicating the flip-flop. The output pair of leads from each flip-flop have the same letters as its own designation, one lead of each pair being indicated by a prime, to distinguish it from the other one.

Network 5 has an output line 6 which transmits a pulse, symbolically represented by +1, for counter-clockwise rotation of commutator 1 each time a conducting segment like 3 makes contact with the brushes B, A, and C in that order. Line 6 is shown in the circuit of Fig. 11 and it has an associated line 7 connected to ground 8. The clock $Cl$ in Figure 11, and in all other figures is a single powerful source of square top pulses having a frequency which is high in comparison to the highest speed of commutator 1. Each clock pulse builds up to a positive value at a rate depending on the resistance in the circuit and on the inherent capacity of the wiring to ground indicated at 9. The maximum value of the clock pulse may be substantially the same as $V_H$ i. e. 140 volts with the minimum value being the same as $V_L$ or 100 volts. When one output terminal of the I, J, or K flip-flop is at a low potential such as 100 volts, and represented by $V_L$, its other terminal will be at a higher potential such as 140 volts represented by $V_H$. Referring to Fig. 11 showing the "and" gating circuit connected to output line 6, if the signals I, J and K' are each at a potential of 140 volts when a clock pulse occurs, a pulse will be transmitted out on line 6 as represented by a +1. Referring to Fig. 12, if the output signals I', J and K from the corresponding flip-flops each have a potential of 140 volts when a clock pulse occurs from the clock $Cl$, a pulse will be transmitted on the output line 10, as symbolically represented by −1, indicating clockwise rotation of commutator 1.

Referring to Fig. 4, as the counter 11 does not form a part of the present invention, it has been schematically represented and may comprise a separate counter for each of the lines 6 and 10, for comparison of their readings, or an up-down counter operated by the pulses in both of the lines 6 and 10.

Referring now to Fig. 3, there is illustrated in detailed form, flip-flop I, typical also of flip-flops J and K, according to the present invention. It includes a pair of triodes whose anodes are coupled through a pair of conventional plate resistors, respectively, to the $V_{HH}$ terminal of a source of positive potential. Also, the output signals, I and I' appearing on the anodes, respectively, of these two triodes are each clamped, through appropriately connected diodes, to the voltage appearing on terminals $V_L$ and $V_H$. The $S_i$ input conductor of flip-flop I is capacitively connected through a diode to the grid of one triode, the common junction between the capacitor and diode being, in turn, coupled through a resistor to another terminal $V_c$ of a source of positive potential.

In the same way, the $Z_i$ input conductor is capacitively coupled through a diode to the grid of the other triode within flip-flop I, the common junction between the diode and capacitor being coupled through a resistor to the $V_c$ terminal. Also, the grids of the two triodes are coupled through separate grid resistors to the terminal $V_{LL}$ of a source of negative potential. Finally, the grids and anodes of the triodes are cross-coupled in conventional flip-flop fashion through a pair of paralleled capacitor and resistor combinations.

Some typical values for the voltages indicated in Fig. 3 and in the other figures, are as follows:

$$V_C = +5 \text{ volts}$$
$$V_{HH} = +250 \text{ volts}$$
$$V_H = +140 \text{ volts}$$
$$V_L = +100 \text{ volts}$$
$$V_{LL} = -365 \text{ volts}$$

Before proceeding with the description of the quantizer's operation, it is first desirable to set forth the operation of flip-flop I in connection with, for example, the portion of the triggering circuitry in net 5 connected to its $S_i$ input conductor, the description serving as an example of the operation of the remaining flip-flops and associated gating circuitry. This triggering circuitry, illustrated in Fig. 5, includes an "and" gating circuit 62 wherein signal A taken from brush A of the input device is coupled through a diode to a common junction 63 therein. Signal J' from flip-flop J is also applied through a diode to junction 63 and signal K' from flip-flop K is likewise applied through a diode to junction 63, junction 63 being, in turn, coupled through a relatively high valued resistor to the $V_{HH}$ terminal. The output signal of circuit 62 is taken from junction 63 through an isolating diode 42 to a corresponding common junction within an "or" gating circuit 64, this junction, in turn, being coupled through a relatively high valued resistor to the $V_{LL}$ terminal.

Signals J and K are applied through respectively associated diodes to a common junction within an "and" circuit 65, this junction being resistively connected to terminal $V_{HH}$ and additionally coupled through an isolating diode to the junction within "or" circuit 64. The output signal of "or" circuit 64, taken from its junction, is applied through an isolating diode 41 to the common junction of an "and" gating circuit 66, signals I' and $Cl$ being likewise applied through corresponding diodes thereto. This common junction is likewise coupled through a relatively high valued resistor to the $V_{HH}$ terminal.

Now, since each output signal from each flip-flop is either at the high or 140 volt level or at the low or 100 volt level as determined by the clamping terminals $V_H$ and $V_L$, since the signal appearing on any brush will be equal to the $V_H$ terminal potential or 140 volts, and since clocking signal $Cl$ varies each timing interval between the 100 and 140 volt levels, it is apparent that only two voltage levels appear throughout the present quantizer's circuit. Considering these levels together with the operation of "and" and "or" gating circuits used in net 5, it may be stated briefly that the output signal of an "and" circuit will be at the 140 volt level only if all input signals applied thereto are simultaneously at the 140 volt level. However, if any input signal is at the 100 volt level, then its output signal will likewise be at the low or 100 volt level. On the other hand, the output signal appearing on the common junction of an "or" circuit will be at the high or 140 volt level if any of its input signals is at the high level and will produce a low output voltage only if all of its input signals are simultaneously low.

Returning now to the operation of Fig. 5 considered in conjunction with flip-flop I, it will be understood that if signal K', signal J' and the brush signal A are simultaneously at their high voltage level, then the output signal of "and" circuit 62, as it appears on junction 63, will likewise be high and this, in turn, will be transmitted through isolating diode 42 to "or" circuit 64 to thereby make the common junction therein also at the high voltage level. On the other hand, if any of signals K', J' or A is low, then junction point 63 will be low and under such circumstances "or" circuit 64 can produce a high level output only if signals J and K, in "and" circuit 65 are both at their high voltage level to thereby apply a resultant high level signal through isolating diode 40 to the common junction of "or" circuit 64.

If, in any event, the signal from "or" circuit 64 is high and further, if signal I' is high then, during the last half of the timing interval when signal Cl is high, the resulting high voltage level appearing on the common junction within "and" circuit 66 will cause the associated grid capacitor of flip-flop I to begin charging up to the 140 volt level from terminal $V_{HH}$ through the resistor in circuit 66. If now, the triode within flip-flop I connected to the $S_i$ input conductor is fully conducting with a corresponding low voltage level being produced in signal I, the subsequent switching of signal Cl at the end of the timing interval to its low voltage level causes this input capacitor to be discharged serially through the diode and grid resistor of the triode.

Upon such an occurrence, the current flow through the triode is reduced by the resultant negative pulse and this reduced current flow, in turn, causes its anode potential to rise. This rise in anode potential, in turn, in being coupled to the grid of the other and then cut-off triode causes its grid bias to be raised above cut-off condition and anode current flow therethrough initiated. This current flow through the other or second triode decreases its anode potential which, when coupled back to the grid of the first triode reduces its current conduction still further.

This interaction between the two triodes continues in almost an instantaneous manner until their conduction states are reversed, that is, the first and second triodes are non-conducting and fully conducting, respectively. Thus, signal I is switched by such an occurrence from its low to its high voltage level while signal I' is switched from its high to its low voltage level.

In the same way, each negative pulse caused by output signal of the "and" circuit of Fig. 6 coupled to the $Z_i$ conductor of flip-flop I being lowered to its low voltage level, would cause, if signals I and I' were initially high and low, respectively, a reversal of the operation above described with signals I and I' going to their low and high levels, respectively.

In Figure 4 the commutator 1 is enlarged for purposes of clarity, although in practice it may take the form of a so called printed circuit where in the segments like 3 and 4 are closely spaced, the brushes A, B, and C being in the form of fine wire.

Three programming flip-flops I, J, and K are provided because five different flip-flop conduction state sequences are required to quantize the rotation of commutator 1 without introducing output signal errors due to brush bounce, shaft jitter, etc., and further for meeting the logical requirement that only one flip-flop is to be triggered by any brush and energized segment contact.

Referring to the flow-diagram in Fig. 1 showing the various flip-flop conduction state sequences, to the table in Fig. 2, and the flip-flop in Fig. 3, a description will now be given of the flip-flop triggering produced by network 5 to obtain the desired quantizing results as indicated previously. In Fig. 1, the letters $a$, $b$, and $c$ refer to contacts made between the conducting segments and the corresponding brushes A, B, and C in Fig. 4, the arrows in Fig. 1 indicating the sequence in which a segment like 3 closes the brush circuits for rotation in opposite directions; and the three consecutive digits, each of either 1 or 0 value, in each block like 12 in Fig. 1 representing the conduction states of the corresponding I, J, and K flip-flops, respectively.

In particular a "1" represents that signal I is at its 140 volt potential, signal I' being correspondingly at its 100 volt level. A "0" represents the reverse of this condition, with signals I' and I being at 140 and 100 volts, respectively. This nomenclature is likewise followed for the conduction states of flip-flops J and K.

In Fig. 1, block 12 shows the conduction state sequence wherein flip-flop I, J, and K are all in the "0" state, termed idle, this being the sequence after brush B has been contacted by a conducting segment with the segment between, but not in contact with, brushes A and C. At the start of operation, to make sure that the I, J, and K flip-flops are in the idle conduction state sequence, an auxiliary potential source not shown may be applied to the in-put terminals $Z_i$, $J_i$, and $K_i$ to "zero" the flip-flops.

There are only two ways in which the machine can leave the idle state, namely (1) if brush A is next contacted by a conducting segment, or (2) if brush C is next contacted by a conducting segment. By following the arrows from block 12 in Fig. 1, it is seen that if brush A is contacted, the conduction state of flip-flop I will be reversed or set as indicated by the first "1" digit in block 13. This resulting sequence of 100 in block 13 is termed alpha. From this alpha sequence, if the next brush contacted is the B one, as indicated at 14, the I flip-flop will be zeroed and the idle sequence of block 12 again produced. However, if brush "C" is contacted during the alpha state, the gates and mixers in Figures 5 to 12 cause first the J flip-flop to be set as indicated by the digit 1 at 15 in block 16, to thereby achieve a sequence of 110. This sequence one clock pulse later simultaneously produces an output signal pulse on the +1 line and automatically reverses the flip-flop I, J, and K conduction states of 110 and 001. This latter sequence, termed beta is shown in block 17. It is apparent that the beta state may be left in two ways also. If brush B is next contacted, as indicated by 18 in Fig. 1, flip-flop K will be zeroed and the idle sequence of block 12 obtained, or if the commutator reverse and contacts brush A next as shown by line 19, the J flip-flop will be triggered to its "1" condition and the sequence 011 of line block 21 produced. This 001 sequence, on the next clock pulse simultaneously generates a pulse on the "—1" line and automatically resets itself to the alpha state, following line 20 from block 21.

Each pulse sent out on line 6 or 10 represents the distance from the center of one conducting segment like 3 to the center of the next conducting segment like 4 or 24.

It should be noted that any single brush-segment contact causes only one flip-flop to be triggered and this, in turn, serves to eliminate errors which might arise if an attempt were made to simultaneously trigger more than one flip-flop. This is true since, if the brush-segment contact were made just prior to the completion of a timing interval, the final gating circuit and only one flip-flop might be raised a sufficient amount to fire or trigger that flip-flop with the other flip-flop accordingly triggered.

In such an event, the contact would cause an incorrect conduction state sequence to be produced with ensuing errors in the quantized output signal.

The table in Fig. 2 is a summary of the circuit conditions indicated in the flow diagram of Fig. 1. From Fig. 2, according to principles set forth in Boolean algebra, equations may be written representing the logical gate and mixer circuits which satisfy the conditions therein presented. One advantage of approaching the subject from this standpoint is that a study of the equations makes it possible to factor certain terms and consequently eliminate redundant circuitry.

The table in Fig. 2 shows the triggering signals which the I, J and K flip-flops are required to generate for each possible flip-flop conduction state sequence and combinations of the A, B, and C brush potentials. Here again, in the three columns at the left a "0" indicates that the brush or flip-flop is in the zero state and a "1" indicates that the brush is contacting a commutating segment or that the flip-flop is "on." An "x" in the a and c columns in Fig. 2 indicates that it is immaterial whether the state is 1 or 0.

In the next three columns under the head "generate," are listed the new states of the flip-flop which are to be generated at the next clock pulse while, in the final two columns, are found the conditions under which the $+1$ and $-1$ output signals are to be generated.

In the first line indicated 25 in Fig. 2 the brushes A, B and C are not necessarily in contact with any of the conducting segments, as indicated by 000, and the I, J, K flip-flops are in their zeroed state, although, as noted previously, the B brush may be contacted during the idle condition without causing any further triggering operations to take place.

In the next line 26, is indicated going out of the idle condition represented by block 12 in Fig. 1, owing to the A brush being contacted, which orders, as shown in the table under the heading "generate" and in Fig. 1, the I flip-flop set to its on condition.

In line 27, as shown in Fig. 1, the idle condition represented by block 12, is changed by the C brush being contacted, which results, as shown in the table under the heading "generate" in ordering the K flip-flop triggering on.

Line 28 indicates that if the flip-flops are in the sequence shown in block 13, Fig. 1, if the B brush indicated by line 14 is next contacted, the sequence would return to idle shown by block 12. However, if the alpha state as shown in the contents of the I, J, and K flip-flops by line 29 of Fig. 2 and denoted by block 13 and the C brush is contacted as denoted by line 29 in Fig. 2, the J flip-flop is turned on as indicated by line 29 under the generate column, the flip-flops I, J, and K would then contain the sequence 1, 1, 0 respectively. This combination as denoted by line 30 of Fig. 2 will automatically, in coincidence with the next clock pulse, both generate a signal on the $+1$ line 6 in Fig. 4 and reset itself to the beta condition shown by block 17 in Fig. 1.

If we are in beta condition denoted by block 17 in Fig. 1 and brush B is contacted, the K flip-flop will be turned off on the next clock pulse and the flip-flops will return to the idle condition, as tabulated at line 31 in Fig. 2. If however, during the beta condition, brush A is contacted, as denoted by line 19 in Fig. 1, the J flip-flop will be ordered set and this combination will automatically send a $-1$ output pulse on line 10 Fig. 4 and re-set itself to the alpha sequence at the appearance of the next clock pulse.

The "X" under the "c" column in line 30 and under the "a" column in line 33 denotes that these particular flip-flop sequences, no matter what the condition of the brushes are at the clock interval during which these states exist, this will have no bearing upon what takes place. In other words, no matter what the condition of the brushes is, once the state denoted by line 30 or the state denoted by line 33 of Fig. 2 has been established, the proper signal will be sent out and the proper reset will take place. This eliminates possibility of error due to brush bouncing during the time interval that the pulse is to be sent as well as reversal errors during such a time interval and errors due to the brush standing on such contact.

To write the logical equations from the information in Fig. 2, look down the columns under "generate" and every time a 1 under the column I is noted place the appropriate term denoted by "contents" in the equation for set I. Every time a "0" is noted under the I column place the appropriate term under contents for 0. Repeat this process for set and zero J and set and zero K equations and for the in-puts into lines 6 and 10 in Fig. 4.

These equations have been simplified and are as follows:

$$S_i = I'Cl(AJ'K' + JK)$$
$$Z_i = IK'Cl(BJ' + J)$$
$$S_j = J'Cl(CIK' + AI'K)$$
$$Z_j = JCl(IK' + I'K)$$
$$S_j = K'Cl(CI'J' + IJ)$$
$$Z_k = I'KCl(BJ' + J)$$
$$+1 = IJK'Cl$$
$$-1 = I'JKCl$$

The circuits corresponding to the above equations are shown in Figs. 5 to 12, for example, the circuit corresponding to the equation for $S_i$ is shown in Fig. 5. In Figures 5 to 12, the diodes may be germanium diodes, and certain of these diodes as indicated at 40, 41 and 42 in Figure 5 are isolating diodes.

In Fig. 6 diodes 43, 44, and 45 are isolating diodes. A signal occurs at $Z_i$ when a clock pulse occurs if I is on, K is off (in zero state) and either J is on or both B is on and J is off.

In Fig. 7 diodes 46, 47, and 48 are isolating diodes. A signal occurs at $S_j$, when a clock pulse occurs, if J is off and either A is on, I is off and K is on or C is on, I is on and K is off.

In Fig. 8 the diodes 49, 50, and 51 are isolating diodes. A signal occurs at $Z_j$, when a clock pulse occurs, if J is on and either both I is off and K is on or I is on and K is off.

In Fig. 9 the diodes 52, 53, and 54 are isolating diodes. A signal occurs at $S_k$, when a clock pulse occurs if K is off and either both I and J are on or C is on, I is off and J is off.

In Fig. 10 the diodes 55, 56, and 57 are isolating diodes. A signal occurs at $Z_k$, when a clock pulse occurs if K is on and I is off and either B is on and J is off or J is on.

In Fig. 11, a pulse occurs on line 6 indicating one direction of rotation, when a clock pulse occurs, if I is on, J is on and K is off.

In Fig. 12 a pulse occurs on line 10 indicating rotation in the opposite direction, when a clock pulse occurs, if I is off, J is on and K is on. The line 58 and its ground 59 represent the other side of the circuit for the line 10, while the condenser 60 represents the inherent capacity to ground as previously explained.

In the flow diagram of Fig. 1, the states of the flip-flops are indicated by way of example, not being dependent upon the particular sequence shown. The same result can be obtained by using the opposite states in blocks 13, 16, 17 and 21. Also, the circuits can correspond to equations which have not been factored, but the advantage of factoring is to obtain circuit elements which serve double functions, reducing the number of diodes and other circuit elements required. Various other modifications may be made in the invention without departing from the spirit of the following claims.

I claim:

1. A device for quantizing the rotation of a shaft rotatable in two directions, said device comprising: means having 1st, 2nd and 3rd output terminals and responsive to a predetermined amount of angular rotation of the shaft in one direction for producing consecutive signals on said 2nd, 1st and 3rd terminals and responsive to a predetermined amount of angular rotation of the shaft in the other direction for producing consecutive signals on said 2nd, 3rd and 1st output terminals; first means responsive to the appearance of consecutive signals on said 2nd, 1st and 3rd output terminals for producing an output signal representing a count up; and second means responsive to consecutive signals appearing on said 2nd, 3rd and 1st terminals for producing an output signal representing a count down.

2. A device for quantizing the movement of a movable element, said element being movable in two directions, said device comprising: means responsive to each predetermined amount of movement of the movable element in one direction for producing a first series of at least three output signals and responsive to each predetermined amount of movement of the movable element in the other direction for producing a second series of at least three output signals; and means responsive to each appearance of said first and second series of signals for producing first and second output signals, respectively.

3. A device for quantizing the rotation of a shaft, said device comprising: means for converting predetermined amounts of angular rotations of the shaft in first and second directions into sequentially appearing 2nd, 1st and 3rd signals and 2nd, 3rd and 1st signals, respectively; first, second and third flip-flops normally in one conduction state sequence following the appearance of said 2nd signal; means responsive to the appearance of said 1st signal and the normal conduction state sequence for triggering said first flip-flop into its other conduction state; means responsive to the other conduction state of said first flip-flop, the normal conduction state of said second and third flip-flops, and to the appearance of said 3rd signal for producing a first output signal; means responsive to the appearance of said 3rd signal and the normal conduction state sequence for triggering said second flip-flop into its other conduction state; and means responsive to the normal conduction state of said first and third flip-flops, the other conduction state of said second flip-flop, and the appearance of said 1st signal for producing a second output signal.

4. A device for quantizing the movement of a movable element having two directions of movement, wherein predetermined movements of the movable element in first and second directions are indicated by the consecutive appearance of 2nd, 1st and 3rd signals and 2nd, 3rd and 1st signals, respectively, said device comprising: a plurality of electronic switches, said switches being responsive to the appearance of said 2nd signal for triggering into a first conduction state sequence; means responsive to the first conduction state sequence of said switches and to the appearance of said 1st input signal for triggering said switches into a second conduction state sequence; means responsive to the second conduction state sequence of said switches and to the appearance of said 3rd signal for triggering said switches into a third conduction state sequence; means responsive to the third conduction state sequence for automatically switching said switches into a fourth conduction state sequence and producing a first output signal representing a predetermined amount of movement of the movable element in the first direction; means responsive to said fourth conduction state sequence and the appearance of said 2nd or 1st signals for triggering said switches into said first or a fifth conduction state sequence, respectively; and means responsive to said fifth conduction state sequence for simultaneously switching said switches into said second conduction state sequence and producing a second output signal representing a predetermined amount of movement of the movable element in the second direction.

5. A device for quantizing the movement of a movable member movable in first and second directions, whereby predetermined amounts of movement said movable member in said first and second directions are characterized by first and second input signal sequences, respectively, said device comprising: at least three times flip-flops having a normal idle conduction state sequence; means responsive to the first input signal sequence for cycling the normal idle conduction state sequence of said three flip-flops; through a series of conduction state sequence changes and producing concurrently therewith a first output signal; and means responsive to the second input signal sequence for cycling the normal idle conduction state sequence of said three flip-flops through another series of conduction state sequence changes and producing concurrently therewith a second output signal.

6. A device for converting each predetermined amount of movement of a movable member in first and second directions into first and second output signals, respectively, said device comprising: means having a plurality of output terminals and responsive to each predetermined amount of movement of the movable member in the first and second directions for producing first and second sequentially appearing series, respectively, of output signals on said plurality of output terminals; a plurality of electronic switches, each of said switches having triggering input terminals and output terminals; first gating circuitry connected from the output terminals of said plurality of electronic switches and the plurality of output terminals of the first named means to the input terminals of said plurality of electronic switches whereby one electronic switch is triggered upon each appearance of a signal on one of the output terminals of said first named means; and second gating circuitry responsive to first and second predetermined electronic switch triggering combinations for producing the first and second output signals, respectively.

7. A device for quantizing the movement of a movable element having movement in at least first and second directions, said device comprising: sensing means having a plurality of output terminals and responsive to predetermined amounts of movement of the movable element in said first and second directions for producing signals in first and second sequences on said plurality of output terminals, the signal appearing on any output terminal for either of said first or second sequences being one or more consecutive electrical impulses; and quantizing means electrically coupled to the plurality of output terminals of said sensing means and responsive to said first and second signal sequences for producing first and second output signals, respectively.

8. A quantizer for quantizing predetermined amounts of movement of a movable member having first and second directions of movement, said predetermined amounts of movement in said first and second directions of the movable member being represented by the sequential appearance of a high voltage level in signals B, A and C and by a high voltage level in signals B, C and A, respectively, said quantizer comprising: I, J, and K flip-flops producing I and I' output signals, J and J' output signals, and K and K' output signals, respectively, each of said flip-flops having first and second input terminals and responsive to signals applied to its first input terminal for producing high and low voltage levels in its first-named and second-named output signals, respectively, and responsive to signals applied to its second input terminal for producing low and high voltage levels in its first-named and second-named output signals, respectively; first means for applying a signal to the first input terminal of said I flip-flop whenever signals I', A, J', and K' or signals I', J, and K are simultaneously at their high voltage level; second means for applying a signal to the second input terminal of said I flip-flop whenever signals I, K', B, and J' or signals I, K', and J are simultaneously at their high voltage level; third means for applying a signal to the first input terminal of said J flip-flop whenever signals J', C, I, and K' or signals J', A, I' and K are simultaneously at their high voltage level; fourth means for applying a signal to the second input terminal of said J flip-flop whenever signals J, I and K' or signals J', I', and K are simultaneously at their high voltage level; fifth means for applying a signal to the first input terminal of said K flip-flop whenever signals K', C, I' and J' or signals K', I and J are simultaneously at their high voltage level; sixth means for applying a signal to the second input terminal of said K flip-flop whenever signals I', K, B, and J' or signals I', K and J are simultaneously at their high voltage level; first output means for producing an output signal representing a predetermined amount of movement of the movable member in the first direction when signals I, J and K' are simultaneously at their high voltage level; and second output means for producing an output signal representing a predetermined amount of movement of the movable member in the second direction whenever signals I', J and K are simultaneously at their high voltage level.

References Cited in the file of this patent

UNITED STATES PATENTS

| | | |
|---|---|---|
| 667,859 | Wood | Feb. 12, 1901 |
| 2,232,896 | Wilson | Feb. 25, 1941 |
| 2,407,286 | Kinkead | Sept. 10, 1946 |
| 2,656,106 | Stabler | Oct. 20, 1953 |

FOREIGN PATENTS

| | | |
|---|---|---|
| 514,364 | Great Britain | 1939 |